United States Patent
Shiraki

(10) Patent No.: US 8,050,571 B2
(45) Date of Patent: Nov. 1, 2011

(54) ILLUMINATION LIGHT RECEIVER AND ILLUMINATION LIGHT COMMUNICATIONS SYSTEM

(75) Inventor: Ryuzo Shiraki, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 474 days.

(21) Appl. No.: 12/403,782

(22) Filed: Mar. 13, 2009

(65) Prior Publication Data
US 2009/0324248 A1 Dec. 31, 2009

(30) Foreign Application Priority Data
Jun. 26, 2008 (JP) ................. 2008-167395

(51) Int. Cl.
*H04B 10/00* (2006.01)
*H04B 10/06* (2006.01)
(52) U.S. Cl. ........................ 398/172; 398/212
(58) Field of Classification Search .............. 398/79, 398/81, 118, 119, 130, 159, 172, 212
See application file for complete search history.

(56) References Cited

U.S. PATENT DOCUMENTS
| | | | |
|---|---|---|---|
| 5,917,625 A | 6/1999 | Ogusu et al. | |
| 6,542,259 B1 | 4/2003 | Andersen et al. | |
| 2002/0167701 A1 | 11/2002 | Hirata | |
| 2003/0185569 A1 | 10/2003 | Nagata et al. | |

FOREIGN PATENT DOCUMENTS
| | | |
|---|---|---|
| JP | 62-90042 A | 4/1987 |
| JP | 6-121325 A | 4/1994 |
| JP | 7-77627 A | 3/1995 |
| JP | 9-247693 A | 9/1997 |
| JP | 2000-253211 A | 9/2000 |
| JP | 2002-290335 A | 10/2002 |
| JP | 2003-287646 A | 10/2003 |
| JP | 2008-92303 A | 4/2008 |

*Primary Examiner* — Armando Rodriguez
(74) *Attorney, Agent, or Firm* — Birch, Stewart, Kolasch & Birch, LLP

(57) ABSTRACT

An illumination light receiver includes: a wavelength separation mechanism separating visible light containing optical signal data distributed among wavelengths corresponding to three primary colors into the wavelengths corresponding to the three primary colors; a dispersion restraining mechanism restraining dispersion of light outputted from the wavelength separation mechanism; and a light receiving portion illuminated, separately for each of the separated wavelengths corresponding to the three primary colors, by the light outputted from the dispersion restraining mechanism, the light receiving portion converting the optical signal data into and extracting an electrical signal.

10 Claims, 1 Drawing Sheet

ILLUMINATION LIGHT RECEIVER AND ILLUMINATION LIGHT COMMUNICATIONS SYSTEM

This application is based on Japanese Patent Application No. 2008-167395 filed on Jun. 26, 2008, the contents of which are hereby incorporated by reference.

BACKGROUND OF THE INVENTION

1. Field of the Invention

The present invention relates to an illumination light receiver and an illumination light communications system that communicate a data signal by use of illumination light (visible light).

2. Description of Related Art

FIG. 2 is a schematic diagram showing one conventional example of an illumination light communications system. In the illumination light communications system of this conventional example, an illumination light transmitter 200 controls driving of a white light emitting device (e.g., a group of light emitting diodes that emit red, green, and blue lights, respectively) based on a data signal D inputted through a modulator 100, thereby generates illumination light X on which the data signal D is superimposed (white light modulated based on the data signal D), and shines it on an illumination light receiver 300. The illumination light receiver 300 includes a light receiving section 310 (a light receiving chip) provided with filters (see the hatched portion in FIG. 2) that allow different wavelength components (in this example, red, green, blue light components) contained in the illumination light X to selectively pass therethrough. The illumination light receiver 300 receives, for each wavelength component, the illumination light X having the data signal D superimposed thereon and then converts it into an electrical signal. The electrical signal thus obtained is demodulated into the original data signal D by a demodulator 400.

As examples of the conventional technology related to the foregoing, JP-A-2008-92303 and JP-A-2000-253211 can be cited.

Certainly, with the conventional illumination light communications system described above, it is possible to communicate a data signal D by use of, for example, visible light for indoor lighting.

However, in the conventional illumination light communications system described above, on the light receiving section 310 of the illumination light receiver 300, the illumination light with all its wavelength components is shone simultaneously. Accordingly, to receive the different wavelength components contained in the illumination light X separately, it is inevitable to form, in the light receiving section 310, filters that allow the different components to selectively pass therethrough.

These filters are typically formed of resin and therefore have the disadvantage of being weak to an external mechanical force; a scratch on the surface of a light receiving device used in the light receiving section 310 may cause a defect in characteristics. Moreover, the process of fabricating the light receiving device needs to additionally include the process of forming the filters; this lengthens the process of fabricating the light receiving device and results in higher fabrication costs and lower yield of acceptable products.

One solution to the above problems is, as shown in FIG. 3, to use a wavelength separation mechanism 320 including a prism or a diffraction grating to separate the incident illumination light X into different single-color lights before it is shone to the light receiving section 310. In this case, however, the separated lights disperse and spread and thus illuminate a larger area; this results in a problem that it is impossible to downsize the light receiving section 310 (and hence the illumination light receiver 300).

SUMMARY OF THE INVENTION

In light of the above problem, it is an object of the present invention to provide an illumination light receiver and an illumination light communications system, with which it is possible to simplify a process of fabricating a light receiving device used in a light receiving section without upsizing the device itself.

To achieve the above object, an illumination light receiver according to the present invention includes: a wavelength separation mechanism separating visible light containing optical signal data distributed among wavelengths corresponding to three primary colors into the wavelengths corresponding to the three primary colors; a dispersion restraining mechanism restraining dispersion of light outputted from the wavelength separation mechanism; and a light receiving portion illuminated, separately for each of the separated wavelengths corresponding to the three primary colors, by the light outputted from the dispersion restraining mechanism, the light receiving portion converting the optical signal data into and extracting an electrical signal.

Other features, elements, steps, advantages and characteristics of the present invention will be more fully understood from the following Detailed Description Of Preferred Embodiments thereof with reference to the attached drawings.

DETAILED DESCRIPTION OF PREFERRED EMBODIMENTS

Figure 1:
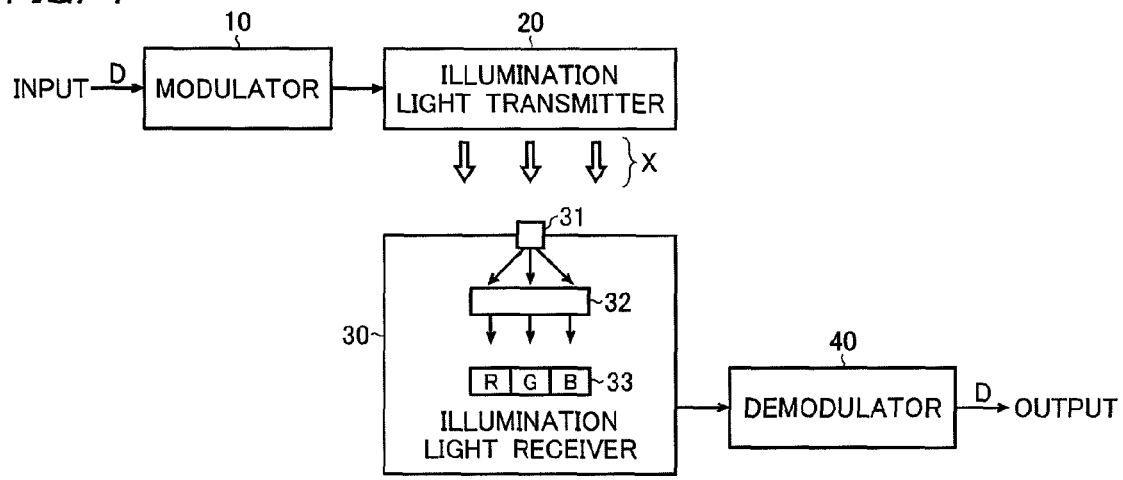
FIG. 1 is a schematic diagram showing one embodiment of an illumination light communications system according to the present invention.
Figure 2:
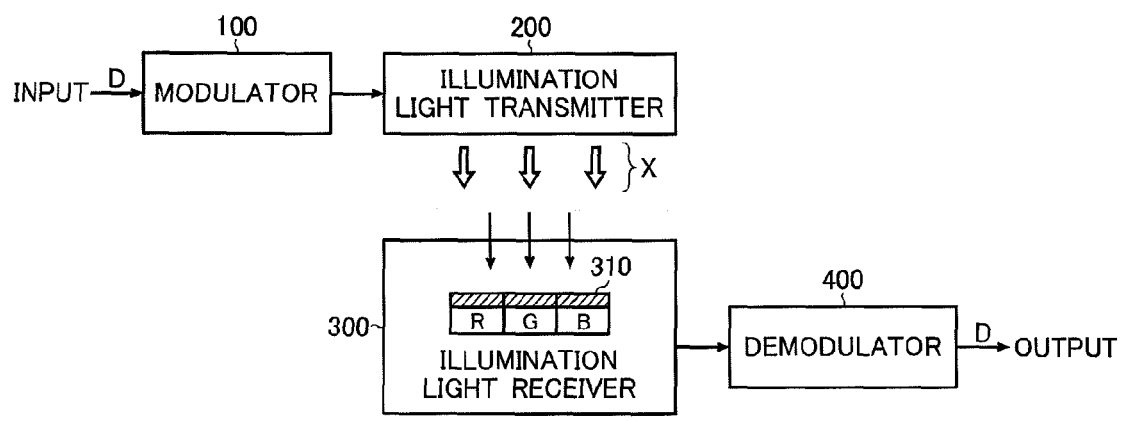
FIG. 2 is a schematic diagram showing one conventional example of an illumination light communications system.
Figure 3:
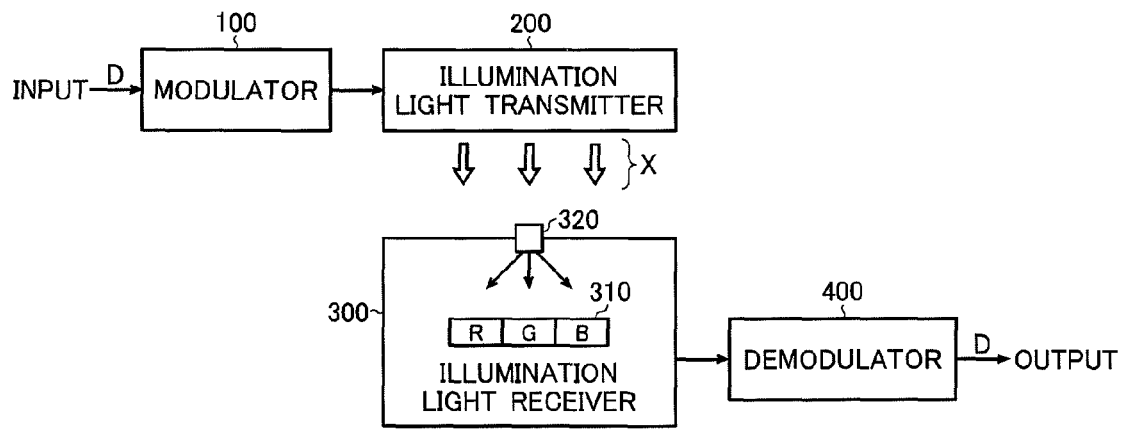
FIG. 3 is a schematic diagram showing another conventional example of the illumination light communications system.

FIG. 1 is a schematic diagram showing one embodiment of an illumination light communications system according to the present invention. As shown in FIG. 1, the illumination light communications system of the present invention includes: a modulator 10; an illumination light transmitter 20; an illumination light receiver 30; and a demodulator 40.

The modulator 10 generates, based on a data signal D, a control signal for modulating illumination light X, and then sends that signal to the illumination light transmitter 20.

The illumination light transmitter 20 is disposed on a ceiling, a wall surface, a desk top, or the like. The illumination light transmitter 20 illuminates an illumination target space with illumination light X (visible light), and in addition superimposes a data signal D on the illumination light X, which is composed of a plurality of wavelength components. In this embodiment, based on a control signal (corresponding to the data signal D) inputted from the modulator 10, the illumination light transmitter 20 controls driving of a white light emitting device (e.g., a group of light emitting diodes that emit red, green, and blue lights, respectively), thereby generates illumination light X having a data signal D superimposed thereon (white light modulated based on a data signal D), and shines it on the illumination light receiver 30. Thus, the data signal D is transmitted in a form distributed among different wavelength components (in the example above, red, green, and blue lights) contained in the illumination light X.

The illumination light receiver 30 receives the illumination light X to receive the data signal D superimposed thereon. In this embodiment, the illumination light receiver 30 includes: a wavelength separation mechanism 31 separating the illumination light X having the data signal D superimposed thereon into a plurality of wavelength components contained in the illumination light X; a light dispersion restraining mechanism 32 restraining dispersion of lights outputted from the wavelength separation mechanism 31; and a light receiving section 33 separately receiving the lights outputted from the light dispersion restraining mechanism 32 (the illumination light X separated into different wavelengths corresponding to three primary colors) and then converting them into electrical signals.

The demodulator 40 demodulates the original data signal D from the electrical signals obtained by the illumination light receiver 30.

Next, the operation of the illumination light receiver 30 configured as described above will be described with the focus on the workings of the wavelength separation mechanism 31 and the light dispersion restraining mechanism 32.

The wavelength separation mechanism 31, using refraction by a prism or light interference by a diffraction grating, separates the illumination light X shone from the illumination light transmitter 20 into predetermined wavelength distribution widths, and thereby generates a plurality of single-color lights (in the example above, red, green, and blue lights).

The light dispersion restraining mechanism 32 includes a reflection mirror, a waveguide realized with an optical fiber or a Fresnel lens, or an interference filter, and the lights (the plurality of single-color lights) outputted from the wavelength separation mechanism 31 and incident on the mechanism 32 has their traveling directions changed appropriately so as to be guided into corresponding light receiving devices.

The light receiving section 33 has light receiving devices (e.g., a photodiode array having a plurality of photodiodes arranged in an array) arranged at positions where it can receive the lights outputted from the light dispersion restraining mechanism 32 separately, and converts them into and outputs electrical signals.

In this way, the wavelength separation mechanism 31 is disposed at a stage preceding the light receiving section 33, so that the illumination light X shone from the illumination light transmitter 20 is separated in advance into the plurality of single-color lights. This eliminates the need for filters that are conventionally required and thus makes it possible to simplify the process of fabricating the light receiving devices; hence it is possible to contribute to improving light reception characteristics, reducing fabrication costs, and increasing the yield of acceptable products.

Further, between the wavelength separation mechanism 31 and the light receiving section 33 is disposed the light dispersion restraining mechanism 32, so that the diffusion of the lights outputted from the wavelength separation mechanism 31 is restrained. With this arrangement, it is possible to narrow down the regions illuminated with the dispersing and spreading lights outputted from the wavelength separation mechanism 31. Now all the light receiving devices have simply to be arranged in a concentrated fashion within the limited illuminated regions in the light receiving section 33; hence it is possible to downsize the illumination light receiver 30.

Next, how to select the optical elements to be used as the wavelength separation mechanism 31 and the light dispersion restraining mechanism 32 will be described in detail below.

The wavelength separation mechanism 31 includes a prism or a diffraction grating, and the light dispersion restraining mechanism 32 includes a reflection mirror, a waveguide realized with an optical fiber or a Fresnel lens, or an interference filter. As to which of those optical elements are to be used, it is preferable to select an optimal combination in consideration of the accuracy required in the illumination light communications system and the device costs.

What combination to select depends on the accuracy of the wavelength of the illumination light X, that is, the S/N ratio of transmitted data, required in the illumination light communications system. So long as the required wavelength accuracy is up to a width of about 30 [nm], the optimal combination is that of a prism used as the wavelength separation mechanism 31 with a reflection mirror used as the light dispersion restraining mechanism 32.

This is because in a case where the separated lights totally reflected on the reflection mirror are shone on the entire surfaces of the light receiving devices to secure an illuminated area necessary for converting the data D into and deriving electrical signals, the wavelength widths of the lights falling within the illuminated regions satisfy the required wavelength accuracy. Note that in the case where the above combination is employed, although the wavelength accuracy obtained thereby is substantially equal to that obtained by the conventional technology, it is possible to approximately halve the regions on the light receiving section 33 where the light receiving devices are arranged.

For the same reason, in a case where the separated lights are shone on the entire surfaces of the light receiving devices, the optimal combination is that of members necessary and sufficient for the wavelengths of the separated lights falling within the illuminated regions to satisfy the required wavelength accuracy.

For example, in a case where the required wavelength accuracy is up to a width of about 10 [nm], the optimal combination is that of a diffraction grating used as the wavelength separation mechanism 31 with a reflection mirror used as the light dispersion restraining mechanism 32, or that of a prism or a diffraction grating used as the wavelength separation mechanism 31 with a waveguide realized with an optical fiber or a Fresnel lens used as the light dispersion restraining mechanism 32.

Further, in a case where the required wavelength accuracy is smaller than mentioned above, a necessary combination is that of a prism or a diffraction grating used as the wavelength separation mechanism 31 with an interference filter used as the light dispersion restraining mechanism 32. Note that in a case where a diffraction grating is used as the wavelength separation mechanism 31 and an interference filter is used as the light dispersion restraining mechanism 32, it is possible to obtain a wavelength accuracy of 1 [nm] or less.

Needless to say, whichever of the above-described combinations is employed, as compared with the illumination light receiver of the conventional technology, it is possible to narrow down the area on the light receiving section 33 where the light receiving devices are arranged.

However, as wavelength accuracy (the S/N ratio of transmitted data) is improved, the device costs increase; it is therefore important to select a combination like those mentioned above in consideration of the kind, amount, reliability, etc. of the transmitted data.

As described above, the use of a diffraction grating as the light wavelength separation mechanism 31 and an interference filter as the light diffusion reduction mechanism 32 makes it possible to easily eliminate stray light. Thus, it is possible to improve the performance of the illumination light communications system according to the required resolution and to realize more accurate data communications accordingly.

According to the present invention, apart from the embodiment specifically described above, various changes can be made without departing from the spirit of the invention. For example, although the above-described embodiment deals with a configuration in which light containing three primary colors (red, green, and blue) as wavelength components is used as the illumination light X, this is not meant to limit how the present invention is practiced; the light emission color of the illumination light X (i.e., the wavelength components contained in the illumination light X) may be changed as desired.

In view of the foregoing, according to the present invention, in an illumination light receiver and an illumination light communications system employing it, a light wavelength separation mechanism is disposed at a stage preceding a light receiving section. This eliminates the need for filters that are conventionally required. Thus, it is possible to simplify the process of fabricating the light receiving devices; hence it is possible to contribute to improving light reception characteristics, reducing fabrication costs, and increasing the yield of acceptable products.

Further, the provision of the light dispersion restraining mechanism makes it possible to restrain the diffusion of the lights separated by the light wavelength separation mechanism. Thus, it is possible to narrow down the regions illuminated with those lights and to realize downsizing of the light receiving section (and hence the illumination light receiver).

Further, the use of a diffraction grating as the light wavelength separation mechanism and the use of an interference filter as the light diffusion restraining mechanism makes it possible to easily eliminate stray light. Thus, it is possible to improve the performance of the illumination light communications system according to the required resolution and to realize more accurate data communications accordingly.

In terms of industrial applicability, the present invention provides useful technology for simplifying the process of fabricating a light receiving device without upsizing an illumination light receiver that communicates a data signal by use of illumination light (visible light), and hence for improving light reception characteristics, reducing fabrication costs, and increasing the yield of acceptable products.

Although the foregoing description deals with the best mode practice of the present invention, it will be apparent to one with ordinary skill in the art that the invention disclosed herein may be changed in various ways and may be practiced in any way other than specifically described by way of an embodiment above. Therefore, the appended claims are intended to include, without departing from the spirit and technical scope of the invention, any modified examples in the technical scope of the present invention.

What is claimed is:

1. An illumination light receiver comprising:
    a wavelength separation mechanism separating visible light containing optical signal data distributed among wavelengths corresponding to three primary colors into the wavelengths corresponding to the three primary colors;
    a dispersion restraining mechanism restraining dispersion of light outputted from the wavelength separation mechanism; and
    a light receiving portion illuminated, separately for each of the separated wavelengths corresponding to the three primary colors, by the light outputted from the dispersion restraining mechanism, the light receiving portion converting the optical signal data into and extracting an electrical signal.

2. The illumination light receiver of claim 1, wherein
    the wavelength separation mechanism includes a prism, and
    the dispersion restraining mechanism includes a reflection mirror.

3. The illumination light receiver of claim 1, wherein
    the wavelength separation mechanism includes a prism or a diffraction grating, and
    the dispersion restraining mechanism includes a waveguide formed with an optical fiber or a Fresnel lens.

4. The illumination light receiver of claim 1, wherein
    the wavelength separation mechanism includes a prism or a diffraction grating, and
    the dispersion restraining mechanism includes an interference filter.

5. The illumination light receiver of claim 1, wherein
    the wavelength separation mechanism includes a diffraction grating, and
    the dispersion restraining mechanism includes a reflection mirror.

6. An illumination light communications system comprising:
    an illumination light transmitter transmitting optical signal data superimposed on visible light; and
    an illumination light receiver receiving the visible light to receive the optical signal data superimposed thereon;
    wherein
    the illumination light receiver comprises:
        a wavelength separation mechanism separating the visible light containing the optical signal data distributed among wavelengths corresponding to three primary colors into the wavelengths corresponding to the three primary colors;
        a dispersion restraining mechanism restraining dispersion of light outputted from the wavelength separation mechanism; and
        a light receiving portion, separately illuminated for each of the separated wavelengths corresponding to the three primary colors, by the light outputted from the dispersion restraining mechanism, the light receiving portion converting the optical signal data into and extracting an electrical signal.

7. The illumination light communications system of claim 6, wherein
    the wavelength separation mechanism includes a prism, and
    the dispersion restraining mechanism includes a reflection mirror.

8. The illumination light communications system of claim 6, wherein
    the wavelength separation mechanism includes a prism or a diffraction grating, and
    the dispersion restraining mechanism includes a waveguide formed with an optical fiber or a Fresnel lens.

9. The illumination light communications system of claim 6, wherein
    the wavelength separation mechanism includes a prism or a diffraction grating, and
    the dispersion restraining mechanism includes an interference filter.

10. The illumination light communications system of claim 6, wherein
the wavelength separation mechanism includes a diffraction grating, and
the dispersion restraining mechanism includes a reflection mirror.

* * * * *